United States Patent
Garg et al.

(10) Patent No.: US 12,487,978 B1
(45) Date of Patent: Dec. 2, 2025

(54) MULTI-MASTER MANAGEMENT OF HIERARCHICAL MASTER AND REFERENCE DATA

(71) Applicant: Oracle International Corporation, Redwood Shores, CA (US)

(72) Inventors: Anurag Garg, Cupertino, CA (US); Douglas Ray Cosby, Austin, TX (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/801,134

(22) Filed: Aug. 12, 2024

(51) Int. Cl.
*G06F 16/00* (2019.01)
*G06F 16/21* (2019.01)

(52) U.S. Cl.
CPC .................. *G06F 16/219* (2019.01)

(58) Field of Classification Search
CPC ...................................................... G06F 16/219
USPC ........................................................ 707/695
See application file for complete search history.

(56) References Cited

U.S. PATENT DOCUMENTS

2020/0042533 A1* 2/2020 Lee ..................... G06F 16/2228
2021/0056097 A1* 2/2021 Banister ................ G06F 16/213

* cited by examiner

*Primary Examiner* — Chelcie L Daye
(74) *Attorney, Agent, or Firm* — Mughal Gaudry & Franklin PC

(57) ABSTRACT

A data synchronization system accesses a plurality of data sets. The system receives a subscription from a third application to a first data set of a first application. When the system receives a notification of an update to a first item of the first data set, and determines via a mapping within the subscription, a value to use as a version of the first field for a corresponding item of a third data set. When the system receives input overriding the first mapping to determine values from a first field of the second data set, the system stores override metadata indicating the second data set is a data source for the third data set. After the mapping is overridden, when receiving a notification of an update to the second data set, the system triggers a modification to the first corresponding item based on the update to the second corresponding item.

20 Claims, 8 Drawing Sheets

MULTI-MASTER MANAGEMENT OF HIERARCHICAL MASTER AND REFERENCE DATA

BACKGROUND

Enterprise data management refers to the management of large volumes of data such as for a factory, a distributed industrial organization, or another large enterprise, often deriving from multiple data sources or applications and including multiple applications that must refer to data representing the same real-world industrial condition. The various applications that an organization uses are not necessarily designed for communication to the other applications that the organization uses. As employees or clients of an organization utilize applications employed by that organization, new data is created and stored by the application that was interacted with. But other applications must access that data as well to be up-to-date with the current state of the organization. Organizations often cannot afford to manage large volumes of hard-coded custom connections between applications.

Application data may be stored either locally or in a remote server in communication with a device running the application. Separate applications used by an organization are not necessarily stored in the same location or on the same device. An application may utilize local data that the application has stored for a given data field, however, that data may be out-of-date as another application may have received or generated new data that would influence the results of the application's processes, yet the two applications do not directly influence the data stored by each other.

BRIEF SUMMARY

In some embodiments, a data synchronization system accesses a plurality of data sets, each managed by their own application. The data synchronization system receives a subscription from a third application to a first data set of the first application. When the system receives a notification of an update, comprising a value, about a first item of the first data set, the system checks the subscription and determines, via a mapping within the subscription, a candidate value to use as a version of the first field for a corresponding item of a third data set. When the system receives input overriding the first mapping to determine values for the first field of the third data set from a first field of the second data set, the system stores override metadata indicating the second data set is a data source for the third data set. After the mapping is overridden, when receiving a notification of an update to a second corresponding item of the second data set, the system triggers a modification to the first corresponding item based on the update to the second corresponding item.

In some embodiments, a data synchronization system accesses a plurality of data sets. The system receives a subscription from a third application to a first data set of a first application. When the system receives a notification of an update to a first item of the first data set, and determines via a mapping within the subscription, a value to use as a version of the first field for a corresponding item of the third data set. When the system receives input overriding the first mapping to determine values from a first field of the second data set, the system stores override metadata indicating the second data set is a data source for the third data set. After the mapping is overridden, when receiving a notification of an update to the second data set, the system triggers a modification to the first corresponding item based on the update to the second corresponding item.

A computer-implemented method includes accessing a plurality of sets of data including a first set of data managed by a first application, a second set of data managed by a second application, and a third set of data managed by a third application, receiving a subscription from the third application to a first version of a first field of the first set of data and a first version of a second field of the second set of data, a second version of the first field existing in the second set of data, and wherein the first version of the second field does not exist in the first set of data. The subscription indicates a first mapping for determining values of the first field of the third set of data from values of the first field of the first set of data. The method further includes receiving a notification about a first item of the first set of data, including a first value of the first field of the first item, determining that the third set of data is subscribed to the first version of the first field of the first set of data and, based at least in part on the first mapping, determining a candidate value from the first value to use as a third version of the first field for a first corresponding item of the third set of data. The method further includes receiving user input overriding the first mapping to determine values for the first field of the third set of data from the second version of the first field of the second set of data, storing override metadata in association with the first field of the third set of data, wherein the override metadata indicates the second set of data is a data source for the third set of data, after storing the override metadata, receiving a notification of an update to a second corresponding item of the second set of data, and based at least in part on the override metadata, triggering a modification to the first corresponding item based on the update to the second corresponding item.

In a further embodiment, the subscription indicates a second mapping for determining values of a second field from the third set of data from values of the second field of the second set of data, and a method may also include receiving a notification of a first update to a second value of the second field of the second set of data, determining that the third set of data is subscribed to the first version of the second field of the second set of data, based at least in part on the second mapping, determining a second candidate value from the second value to use as a second version of the second field of the third set of data, and receiving user input overriding the second version of the second field of the third set of data, then receiving a notification of a second update to the second value of the second field of the second set of data and based at least in part of the second mapping, determining a third candidate value from the second value to use as a second version of the second field of the third set of data.

In a further embodiment, the subscription indicates a second mapping for determining values of a second field from the third set of data from values of the second field of the second set of data, and a method may also include receiving a notification of a first update to a second value of the second field of the second set of data, determining that the third set of data is subscribed to the first version of the second field of the second set of data, based at least in part on the second mapping, determining a second candidate value from the second value to use as a second version of the second field of the third set of data, receiving a user input overriding the second mapping to determine values for the second field of the third set of data from an internal source within the third application, and storing override metadata in association with the second field of the third set of data, wherein the override metadata indicates the second set of data is not a data source for the third set of data . . .

In a further embodiment, the subscription is also to a third field of the third set of data and after storing the override metadata, the subscription indicates a third mapping for determining values of a third field of the third set of data from values of a third field of the first set of data In a further embodiment the user input overriding the mapping includes a response to an indication of a preference for subscribing to the first field of the second set of data.

In a further embodiment, a method may also include storing the subscription as an entry in a table comprising identifying data of the first application and identifying data of the third application.

In a further embodiment, receiving the subscription from the third application may include receiving an indication that the first field of the first set of data and the first field of the third set of data refer to the same value In a further embodiment, the receiving user input overriding the first mapping is in response to an indication that the first set of data is no longer available.

In a further embodiment, the subscription comprises an update setting, and the triggering the modification to the first corresponding item is at least in part in response to the update to the second corresponding item of the second set of data satisfying one or more conditions specified in the update setting.

In a further embodiment, a method may also include generating the subscription from the third application to the first version of the first field of the first set of data based at least in part upon an indication from a machine learning model that indicates the first version of the first field of the first set of data is a most complete version of the first field from which to determine a candidate value.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
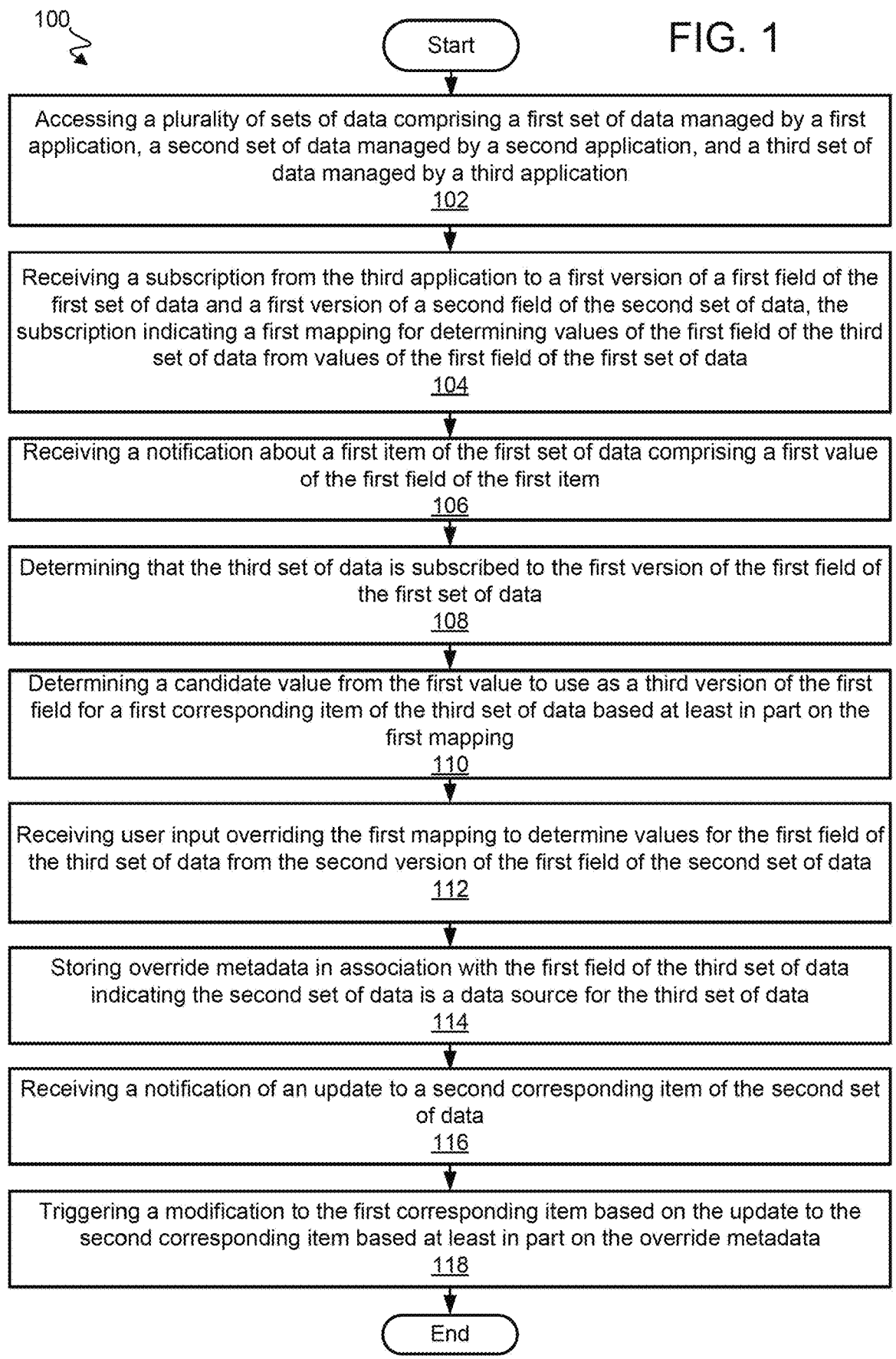
FIG. 1 depicts a set of steps for performing some embodiments.

In some embodiments, a computer-implemented method includes accessing a plurality of data sets, each managed by their own application, and receiving a subscription from a third application to a first data set of the first application. When receiving a notification of an update, comprising a value, about a first item of the first data set, the system checks the subscription and determining a candidate value to use as a version of the first field for a corresponding item of a third data set. When receiving input overriding the first mapping to determine values for the first field of the third data set from a first field of the second data set, the system stores override metadata indicating the second data set is a data source for the third data set, and thereafter, when receiving a notification of an update to a second corresponding item of the second data set, the system triggers a modification to the first corresponding item based on the update to the second corresponding item.

In various embodiments, the data synchronization system is implemented using non-transitory computer-readable storage media to store instructions which, when executed by one or more processors of a computer system, cause display of the user interface and processing of the received input to determine master data relationships. The data synchronization system may be implemented on a local or cloud-based computer system that includes processors and a display for showing the user interface to a user for determining master data relationships. The computer system may communicate with client computer systems for determining master data relationships.

A description of a data synchronization system is provided in the following sections:
GENERAL OVERVIEW
DATA MATCHING
DEFINING SUBSCRIPTION TO A MASTER
OVERRIDES OF SUBSCRIPTION ASSIGNMENTS
COMPUTER SYSTEM ARCHITECTURE The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

General Overview

Various techniques described herein relate to storing and managing master data. A single organization may operate multiple different systems or applications for receiving, storing, analyzing, and outputting data. Such systems or applications may relate to any aspect of the organization, including organization-related systems, employee-related systems, customer-related systems, vendor-related systems, product-related systems, or systems relating to the technical infrastructure of the organization. An organization's varied systems and applications may store data across multiple devices, potentially across multiple locations, or values and versions of data for applications or systems may be centrally managed. An organization's systems, applications, or personnel that manage a consumable version of a set of data are examples of data object management entities that reference and manipulate data relating to the system or application configured to consume the set of data. The systems and applications that an organization employs often refer to overlapping sets of information about the organization for which no single application has a complete "golden" record of the organization's data that covers all downstream use cases by all applications. Each application may store its own version of the organization's data that the application refers to. To ensure that the data an application uses is up-to-date and accurate, the application should have an authority to reference for the values of that data, such as a master record for that data.

When a set of data has a master to reference as an authority for values of the set of data, the set of data is said to be subscribed to that master. The decision of what other set of data to use as a master is determined by subject matter experts who have the knowledge necessary of the data to determine proper sources of master data. For any one set of data there may be multiple subject matter experts making determinations of master data. Each subject matter expert making determinations of master data for an application or system is an object management entity of the system. Therefore, with multiple subject matter experts and multiple applications or systems for those subject matter experts to manage, there may be a large number of object management entities for any one set of data. Despite the large number of object management entities to control data mastering for any one set of data, the subscriptions may still be maintained centrally for any or all sets of data such that there are not conflicts between subscriptions.

FIG. 1 illustrates a set of steps 100 for managing subscriptions between data sets for master data management. At block 102, a plurality of sets of data are accessed, the plurality of sets of data comprising a first set of data managed by a first application, a second set of data managed by a second application, and a third set of data managed by a third application. At block 104 a subscription is received from the third application to a first version of a first field of the first set of data and a first version of a second field of the second set of data, the subscription indicating a first mapping for determining values of the first field of the third set of data from values of the first field of the first set of data. For this example, there is a second version of the first field in the second set of data that is also a viable subscription target for the third set of data, however, this does not necessarily imply that there must also be a second version of the second field in the first set of data. At block 106, a notification is received about a first item of the first set of data comprising a first value of the first field of the first item. At block 108, it is determined that the third set of data is subscribed to the first version of the first field of the first set of data. At block 110, a candidate value is determined from the first value to use as a third version of the first field for a first corresponding item of the third set of data based at least in part on the first mapping. At block 112, a user input is received overriding the first mapping for the first corresponding item to determine values for the first field of the third set of data from the second version of the first field of the second set of data. At block 114, override metadata indicating the second set of data is a data source for the third set of data is stored in association with the first corresponding item, wherein the override metadata indicates the second set of data is a data source for the third set of data. At block 116, a notification of an update to a second corresponding item of the second set of data is received. At block 118, a modification is triggered to the first corresponding item based on the update to the second corresponding item based at least in part on the override metadata.

Figure 2:
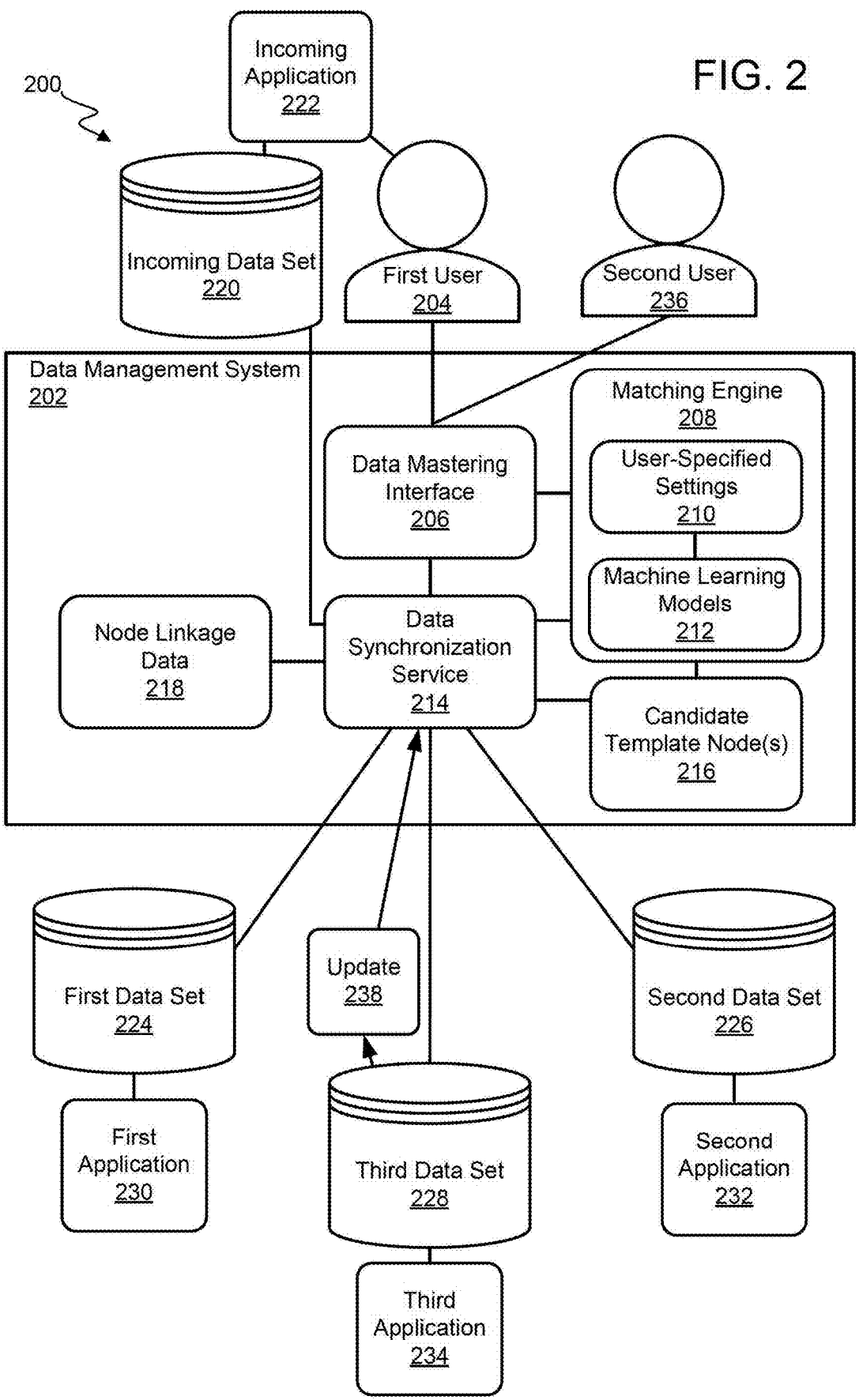
FIG. 2 depicts a simplified diagram of a distributed system for implementing some embodiments.

FIG. 2 illustrates a simplified distributed system for master data management of multiple data sources by a user. In this example, a system architecture 200 includes one or more data management systems 202 accessed by a first user 204. The first user 204 interacts with the data management system 202 via a data mastering interface 206. Within the data mastering interface 206, the first user 204 directs the data management system to create subscriptions for an incoming data set 220 associated with an incoming application 222. The first user 204 can set settings for matching between objects that are stored in a matching engine 208 as user-specified settings 210. The matching engine 208 utilizes the user-specified settings 210 and optionally machine learning models 212 to suggest matches between data sets for setting masters of data fields of the incoming data set 220. As the first user 204 is able to view the incoming data set 220 via the incoming application 222, the first user 204 is able to make decisions via the data mastering interface 206 for which fields should be subscribed to other data sets based on the suggested matches from the matching engine 208

The data mastering interface 206 controls a data synchronization service 214, which records the subscriptions to other data sets for the incoming data set 220. Based on the subscriptions, the data synchronization service 214 records mappings between the records of the incoming data set 220 to the other data sets as links within the object linkage data 218. The data management system 202 is configured to access data from one or more data sets 224-228, which can be suggested to be used as optional master data if matched by the matching engine 208 or the first user 204. The data synchronization service 214 also records and manages the links to master data sets for records of the one or more data sets 224-228 via the object linkage data 218. The one or more data sets 224-228 are managed by a plurality of separate systems 230-234 and initial subscriptions, master relationships, and/or overrides, etc. for the one or more data sets 224-228 may be defined by a second user 236. The first user 204 and the second user 236 may have different knowledge or expertise of the data and systems within the system architecture 200 that may or may not overlap. As shown, the first user and second user are individual users, but the data sets may also be managed by groups of users for which any member of the group may use data mastering interface 206 to configure subscriptions, master relationships, and/or overrides. As detailed above, the separate systems 230-234 may correspond to data systems of an organization's industrial applications, organization-related applications, employee management applications, resource management applications (e.g., server management, computer network management, etc.), and/or any other specialized hardware/software systems implemented for an organization.

Data stores 224-228 may be databases (e.g., Microsoft SQLServer, Oracle, Sybase, ODBC, or other database known in the art). Additionally or alternatively, data stores 224-228 may be cloud-based data sources, and one or more systems 230-234 may correspond to cloud applications with data management models for those applications stored in the data management system 202. Thus, the data management system 202 may be configured to natively push data to and/or pull data from such applications, and to validate that the data is correct and complete for the application. This may include the ability to register new applications with the data management system 202, so that the new applications may play the role of publisher and/or subscriber in the data management process. Certain non-limiting examples of cloud-based applications that may be supported in such embodiments include, for example, ORACLE Planning and Budgeting Cloud Service (PBCS), ORACLE Enterprise Performance Reporting Cloud Service (EPRCS), ORACLE Financial Consolidation and Close Cloud (FCCS), ORACLE Hyperion Financial Data Quality Management, Enterprise Edition (FDMEE), and ORACLE Fusion General Ledger (G/L), among others.

Data systems 230-234 may be implemented as separate and heterogeneous systems, and may have little or no intercommunication and little or no knowledge about the other systems even if stored within the same physical system. Nonetheless, there may be overlap in the reference data of systems 230-234. For example, a financial data system 230 may organize particular expenses, which may include reference data related to the structure of the organization (e.g., relating to departments, divisions, or sections of the organization). Additionally, a separate costing system 232 may organize data which includes reference data related to the geographical location at which particular expenses occur. While some piece of reference data may overlap between these two hierarchies, the financial data system 230 may have little or no knowledge about the costing data system 232 and the costing data system 232 may have little or no knowledge about the financial data system 230.

A system or application contains a set of data which that system or application references in performing operations. A set of data may contain one or more data objects, representing certain aspects of the organization. For example, a single application may need to reference a customer object, storing data about an organization's customers, and a pricing object, storing data about the organization's pricing of its goods or services. An object has one or more fields each with individual values for every record, item, or row of the object. For example, a customer object may contain fields pertaining to identifying information about the customer or information relating to past work for that customer, and each record within the customer object represents a different customer. Updates or changes to or independent management of the values of a record define different versions of that record.

For objects managed across separate applications that refer to the same information despite differences in which fields or field versions those objects have or what those field versions hold, these objects are referred to as separate instances of the same object. For example, two separate applications may both want to associate their own application-specific data with each of the organization's customers. Those two applications refer to a customer object in obtaining data of those customers. The two applications' data referencing the customers are separate instances of the same customer object for the organization, containing separate instances of record data (record instances). Changes to the structure of an application's data, such as a change to the fields of the object used by the application, may also be referred to as a separate instance of the object. Values of different instances of an object are linked together using a foreign key, record ID, or other reference indicating that the versions of the records of the object refer to the same record of the same object even though the record versions currently stored by the separate applications may contain different values.

When defining an object referenced by an application, one or more subscriptions are defined for the object. A subscription defines a connection to another object such that for any field of the object included in the subscription there is a corresponding field of the other object that may be used to obtain values from. When a subscription defines a first field of another record as a source of data for a second field, the first field and the object it is a part of is said to be the master for the second field. A field with a defined master is subscribed to that master, meaning that by default updates to values of the field in the master are sent to all objects containing fields that subscribe to the master to update the values of those dependent fields. In the case of conflicts between the value of a field in a target object and the value in a field of the master, the value of the master presides and is copied to the field of the target object, unless there is a setting for the field to enable overriding of the value from the master.

To define a master for a field, the master file location must be defined for the system or application to be able to reference the current values within the master. To define a master, an application may have a pointer or reference location defining a master application or system that contains the master field. That master may be housed on the same device as the application or system or the master may be housed on a different device such as a remote server. Even if on separate devices, management of the master relationship may be managed by a single data management system running data models for the application or system and its master. A master may also be defined as a data file that is not associated with only one application or system. Data sets whether independent data sets, application-specific data sets, or data sets relating to multiple applications, may be referred to as objects within the data management system.

A master may be defined for fields by a subject matter expert who can define corresponding fields across objects or object instances. The data management system's mapping of master relationships may be maintained by the action of multiple subject matter experts with different expertise managing relationships for different applications. When first defining data for an object or object instance or when first incorporating a new object into the mastering system, a subject matter expert may define, for fields of data of that object, all corresponding fields of other objects or object instances. The total set of definitions or rules for correspondences with other objects or object instances or versions is a subscription.

The subscription may be defined by a subject matter expert by manually selecting the objects and fields of those objects to define correspondences. Alternatively, the subscription may be defined by the results of a matching process that may be approved by a subject matter expert. The matching process to automatically determine proposed object or field correspondences may be performed by a matching engine that includes multiple processes for identifying and confirming correspondences. The matching engine may use rules-driven processes, AI-driven processes, or serial or parallel hybrid processes including rules and AI. Example AI-driven processes are described in more detail in the section entitled, "AI Driven and Hybrid Matching."

Figure 4A:
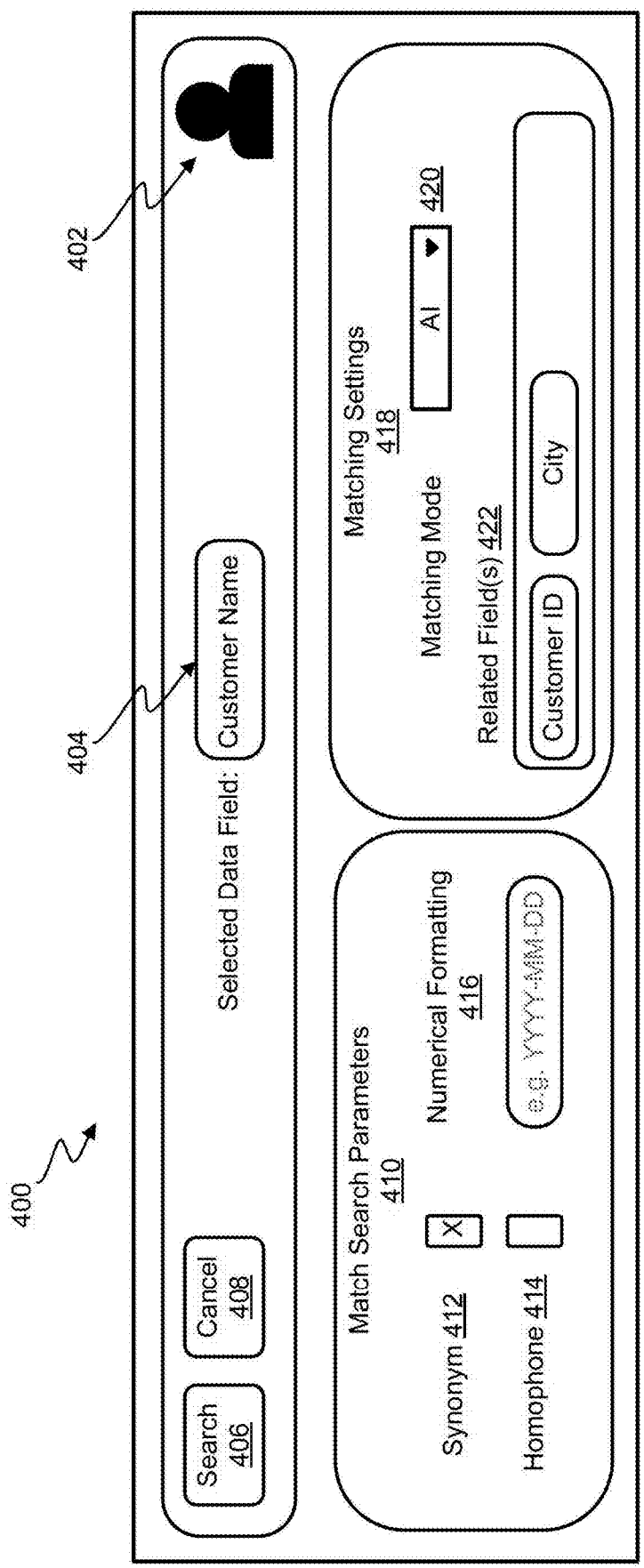
FIGS. 4A and 4B depict example user interfaces used for implementing some embodiments.
Figure 4B:
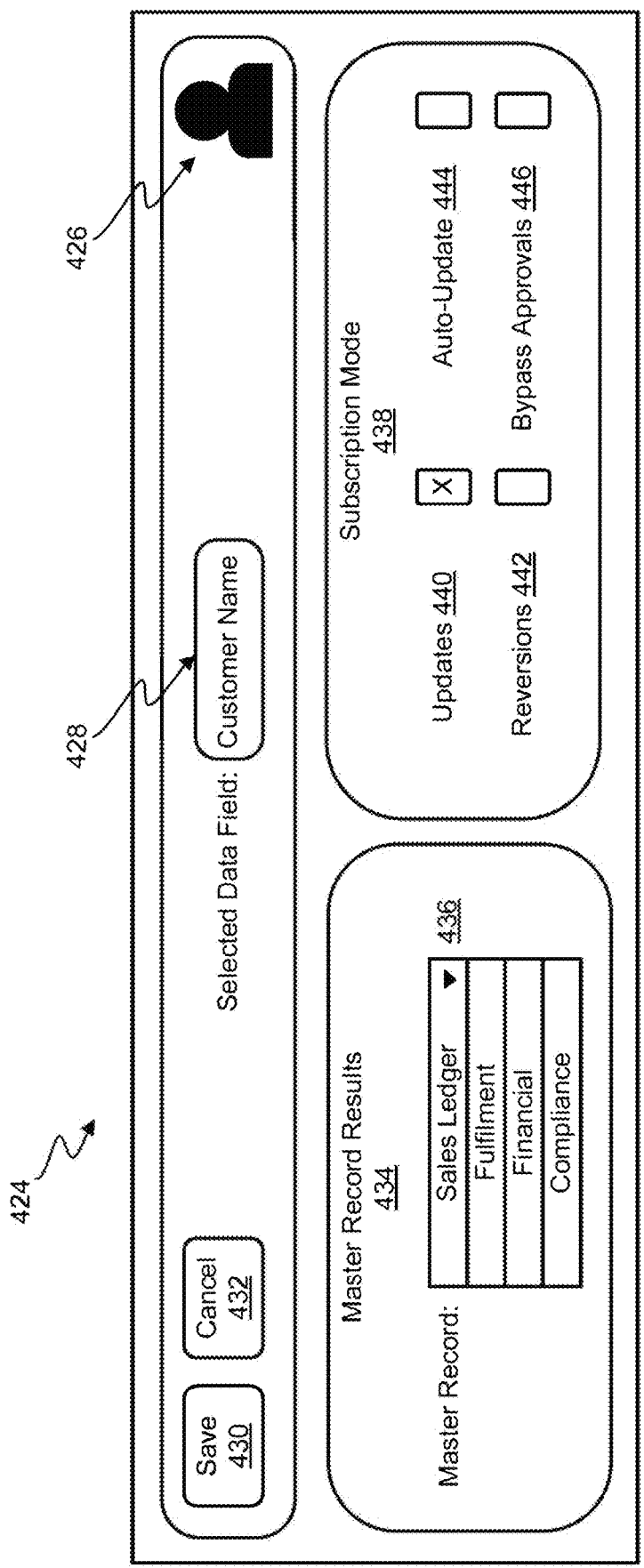

FIGS. 4A and 4B depict data mastering user interfaces for determining data dependencies and master data sources for data of an organization's application by a subject matter expert. FIG. 4A depicts a user interface 400 for use by a recognized subject matter expert 402 to determine master data for a selected field or object 404. The user interface may include options to allow the user to save the current settings for future use, run the search with current settings 406 or to discard the current settings 408. The user interface also includes search parameter fields 410 for entering user defined matching search parameters. The search parameter fields 410 may include any of the search parameters or settings described below such as the depicted settings for searching by synonyms 412, searching by homophones 414, or for searching by known numerical formatting 416. The user interface may also include settings 418 for the method of matching. The matching settings 418 may include a field 420 for determining the method of search either by AI, by a rules-driven process, or by some hybrid process. The matching settings 418 may also include a field 422 for user-provided search guidance such as related fields to consider in the search.

FIG. 4B depicts a user interface 424 for use by a recognized subject matter expert 426 to determine master data for a selected field or object 428. The user interface may include options to allow the user to save the current match linkage for the selected object 430 or to discard the current results 432. The user interface also includes a master matching results field 434 for displaying the results of the matching search or for receiving input form the user to determine the matching object to use as the master object. The master matching results field may include a master selection field 436 for receiving user input for determining a matching object. As depicted in FIG. 4B, the user input may select a different object than a best object determined by the search. The user interface may also include a subscription mode field 438 for receiving user input determining settings for the master subscription to be stored. The subscription mode field 438 may include, for example, an option for receiving future updates to the master object 440, an option for receiving reversions of the master object to previous values 442, an option for auto-updating the selected data field upon receiving updates to the master object 444, and an option for bypassing approval requirements for updates sent to the selected data field 446.

Data Matching

Rules-Driven Matching

The matching process may be simplified by the use of stored foreign keys for data of different applications such that corresponding data may be identified across data sets. If foreign keys are available, candidate matching data sets may be determined by a search for matching foreign keys. Even when using foreign keys, a best matching data set of the candidate matching data sets may be determined by applying further rules, applying an AI model, or by selection by a user.

The matching process may make use of common ancestry information for hierarchical data to find matching objects or template objects that are already connected between different hierarchies, and the template objects are used to find matching objects between the different data hierarchies. When an object is created, the object may be created in a same location in the hierarchy as similar objects, and the location in the hierarchy may be used to help find a template object for establishing the connection with another hierarchy. A rules-driven process may use matching field(s) to match a new or changed object, potentially including automatically determined roll-up value(s) based on changed field(s) in the object, to an existing object in a same region of the hierarchy (i.e., with a common ancestor), and the existing object may be used as a template object to establish a connection with another hierarchy.

In one embodiment, when adding an object to a hierarchy, a data management system determines a closest neighbor or other template object existing in the hierarchy of the incoming object. For example, the template object may be determined based on a specified characteristic associated with the hierarchy or based on a specified combination of characteristics associated with the hierarchy. For example, the template object selection may have a preference for objects sharing a same parent (e.g., a same manager in the case of an employee) or other ancestor, and a further preference for objects sharing one or more same values for one or more fields (e.g., a home or work city name, home or work state name, or building name in the case of a location). The template object may be selected as the model-after object for the new object. A different model after object may be selected to establish connections to different objects, and different user-configurable rules may be established to select the template object for each of the fields to match. Fields may also be grouped together such that a same rule or rules may be used to select a template object for multiple fields.

The rules may be stored and customized by subject matter experts that know what type of subscriptions should be recommended or made between which fields and whether conditions should apply to those subscriptions. Different subject matter expert users may save rules for establishing connections with different objects or fields, such that a single subject matter expert does not need to be aware of the logic of each set of rules. The rules may be defined by selecting a field or fields for which to establish a subscription and defining the condition for subscription, such as a detected similarity between the field names. The task of manually connecting a single object to existing objects may be just as time-consuming as the task of establishing rules to automatically connect the single object to existing objects, but the rules may be applied to hundreds or thousands of objects without requiring manual connections to be made on a record-by-record basis.

Rules may be applied to the matching search in a predetermined order or priority based on the requirements of the search or the relationship between rules. For example, a rule may first determine all objects or fields with data in a given numerical format (e.g. YYY-MM-DD). The resulting list of data can then be further searched to find all data within a given range of values of that numerical format (e.g. dates between 2008 Jan. 1 and 2024 Jan. 1).

Some rules may be applied after a set of candidate matching objects have been identified to determine a best matching object. For example, a rule may state that between a set of possible matching objects, the object with the most data for the given field should be used as the master data. In another example, a rule may state that the existing links to or from any of the set of candidate objects should be checked to exclude objects that link to other objects within the set as their own master or to choose a best object as the object with the most links to it as a master.

Occasionally, the user-specified rules might not find a matching object or a matching template object for use to establish connection(s) with target object(s). If no such object is found the data management system may notify a user that the data management system failed to identify a matching object or template object that satisfies the user-specified rule(s) that apply. The notification may include an option to select a template object or to manually select a connecting object.

The rules may specify whether automated changes should be reviewed or not when an object is created and/or when an object is modified. For example, upon creation of an object by a data management user, the data management user or another user such as a subject matter expert for the subscribed data set may be prompted, via a notification to the data management user or another user, or via another user interface option, to add the object to certain dimensions using certain template objects and/or certain mapping fields and values of those template objects. The user interface option may display proposed connections between new object(s) and existing dimensions. In one embodiment, the proposed connections may be displayed concurrently with an underlying reason or rule condition that triggered the proposed connection and/or a template object that was used to recommend the proposed connection. The data management user or other user may accept or reject various proposed connections in bulk, for example, on a same page of a user interface, corresponding to the same added object. If the data management user or other user added multiple objects at a time, the data management user may accept or reject various proposed connections in bulk, on a same page of a user interface, corresponding to the multiple added objects. For example, the different proposed connections may be displayed along with checkboxes to accept or reject the proposed connections, and the user may scroll up or down the page to check or uncheck the checkboxes. The checkboxes may be checked or unchecked by default. The changes may await review by the data management user or other user, or the changes may be applied automatically and rolled back if rejected by the data management user or other user.

In some scenarios, for a given object, the data management system may not be able to match the given object to a specified value of an existing rule, or may not be able to match a mapping value derived from the given object (e.g., the raw value from the object or a deterministic transformation of the raw value, such as a 2-letter representation of a full name of a state, or a YYYY-MM-DD representation of a date formatted as MM-DD-YYYY) to an existing value in an existing dimension, and, as a result, an automated connection from the object to a dimension corresponding to the rule may not be automatically created. The data management user or another user such as a subject matter expert for the subscribed data set may be notified of any objects for which rules were unable to find a matching dimension value, and the data management user or other user may find a corresponding dimension value to use for the object or confirm that no connection should be made to the unmatched dimension. The notification to the data management user may indicate which rule was attempted to be matched, whether a template object was found, if a template object was found, the template object that was attempted to be used, which value was attempted to be connected in the corresponding dimension, and/or what error was experienced in attempting to connect the value to the object. The notification may include an option to select another dimension value to select to connect to the object or another object to use as the template object, and may include an option to retry the connection and/or abort the connection. If the connection is aborted, the object remains unconnected along the dimension. The notification may include these options for multiple objects in which dimension connections failed, including options to remedy or abort the connections for each of the failed dimension connections. These options may be displayed in rows with columns to change the template object and/or the dimension value to use, and an option to retry or abort for each row.

The matching engine may also use various matching algorithms for determining matching objects. In one example, the matching engine may employ an algorithm for detecting synonyms between values of a field of two objects. The algorithm may detect synonyms as a binary result or may give a numerical similarity value which can be compared to a threshold. Detected synonyms may be compared to stored rules entered by a user or presented to a user after detection for confirmation of a matching object.

In another example, the matching engine may employ an algorithm for detecting homophones, such as the Soundex algorithm, between values of a field of two objects. Rules entered by the user may be used to determine when a detected homophone indicates a matching value. Detected homophones may also be presented to a user who may confirm if the detected homophone indicates a matching value. Detected or confirmed homophones may be used with other detected matching fields to determine a matching object.

AI-Driven and Hybrid Matching

An AI-driven process may use vector embeddings of a new or changed object in comparison with vector embeddings of existing objects to find matching objects. The same process may be used to find a similar object in the same region of a hierarchy (i.e., with a common ancestor), and the similar object may be used as a template object to establish a connection with another hierarchy to find further matching objects.

In another embodiment, matching objects are selected using artificial intelligence without using a fixed set of rules that relies on a specific field for each matching object determination. In this embodiment, the fields and combinations of fields of existing matching objects may be used to generate vector embeddings that represent multiple objects. The existing connections between objects may be used as labels for the vector embeddings to train a machine learning model to detect features in the vector embeddings that predict labels as connections between objects. For example, vector embeddings leading to the same existing connection to a object may be clustered into one or more clusters, and an aggregate vector embedding may be determined by averaging, computing a maximum or minimum, or determining some other aggregate combination of the vector embeddings in the cluster. The aggregate vector embedding may be used for comparison against vector embeddings of incoming objects to match against the existing connection of the cluster corresponding to the aggregate vector embedding.

In one embodiment, separate vector embeddings for each existing object in the source domain that has an existing connection via a given field may be compared separately against a vector embedding for the new or updated object in the source domain. An aggregate vector embedding does not need to be determined if each vector embedding is compared individually.

The vector embeddings for a object or cluster of objects may be based on separate field values in the object and/or may be based on a concatenation of one or more or all of the field values for the object. The concatenated field values may be processed to detect further features that may be present within the concatenated text even if the features are detected across multiple fields.

The distance between the vector embeddings may be determined using a cosine distance between two vectors, using a Pearson correlation coefficient between two vectors, using a Euclidean distance between two vectors, and/or using any other vector distance metric. The distance may also be determined by determining a Levenshtein distance between the two strings before converting to vector embeddings.

When generating vector embeddings and/or when determining distances between vector embeddings, certain fields may be weighted higher than other fields, causing a higher scaled distance when these fields are different and a lower scaled distance when these fields are similar. In one embodiment, the user-specified setting include preferred matching field(s) that are not required but that have an increased weight with respect to other fields. An object may be identified for use as a master object based at least in part on an increased weight of the preferred matching field(s).

In the same or a different embodiment, some fields may have a high correlation with other fields for determining a similarity between objects. Vector embeddings for such fields with high correlations may be given higher weight than other fields. Fields having a high correlation with other fields may be determined by an AI model, or an association between fields may be determined by input from a user for correlated fields.

In one embodiment, objects or fields can be referenced by other objects or fields in a multi-dimensional database structure such as one that includes a roll-up hierarchy where higher-level fields encompass, summarize, or otherwise aggregate values of lower-level fields. In this embodiment, a user-specified setting may indicate a preferred common ancestry, such as a preference that the template object share a same parent or grandparent object, that is not required but that results in increased weight for matching objects. A object may be identified for use as a master object based at least in part on an increased weight of a subset of objects sharing the preferred common ancestry. The subset of objects receiving the preferred weighting may be all objects for which distances were calculated or only a subset of objects for which distances were calculated.

In one embodiment, the vector embeddings of existing objects are clustered so that a single distance may be determined between similar existing objects and the first object, without determining a distance between the first object and all existing objects. For example, the clustering may group together a subset of objects having a same connection to a master object. Aggregate vector embedding may be determined for each of the clusters, and a distance may be determined between the first object and the aggregate embedding(s). For example, the aggregate vector embedding may include a mean, median, maximum, or minimum value for each value represented by the vector embeddings of the objects in the cluster.

Vector embeddings may exclude blacklisted field(s) and/or include whitelisted field(s) based on a blacklist and/or whitelist specified by the user. Different user specified settings for different mappings between objects may be linked to different whitelists and/or blacklists, such that different fields may be whitelisted or blacklisted specifically to certain dimension-to-dimension mappings or generically with respect to all or a subset of dimension-to-dimension mappings. In one example, based on a blacklisted specified for a user-specified setting, the data management system filters out, from the source dimension, field(s) that are on the blacklist, and/or filters in, from the source dimension, field(s) that are on the whitelist. The vector embeddings may then be generated, both for the new or changed object(s) and for the existing object(s) to compare with the new or changed object(s), based on fields other than the blacklisted field(s) and/or based on fields including only the whitelisted field(s).

A blacklist preference may be specified without adding specific fields to the blacklist but by identifying a type of field that should be blacklisted if that type of field exists. Such a restriction may be applied generically with respect to dimension-to-dimension mappings or specific to a given mapping. For example, a user-specified setting may be subject to an option to exclude fields that have a protected class of information, such as race, gender, or sexual orientation. Based on this setting, the data management server may filter, from the source domain, any field(s) predicted to have a protected class of information. The vector embeddings for distance comparison may be generated based on fields other than the excluded field(s) after the filtering. Such restrictions may help to ensure that race, gender, sexual orientation, or other biases are not reinforced by the data management system.

As with the rules-driven process, the AI-driven process may include options for automatically applying recommended connections, for triggering manual review of recommended connections before they are automatically applied, and/or for automatically applying recommended connections with an option to roll back incorrect connections via a triggered manual review. The review may be triggered for the data upload user or the data reviewing user, which may be the same or different users. Different dimension mapping recommendations may be routed to different users for review, depending on subject matter expertise of the users. Such routings may be specified in the dimension-to-dimension user-specified settings or rules, for example.

In one embodiment, objects of the source domain that are considered as candidate template objects may be restricted to those objects that share a same parent, are in a same section of an object hierarchy, or have a same grandparent, great grandparent, or other common ancestor or ancestor characteristic as the new or updated object. In another embodiment, the object ancestry restrictions may be soft restrictions that are used to rank objects with a preferred ancestry higher than objects that do not have the preferred ancestry for use as the template object.

The incoming object may be used to semantically search for other objects that are similar to the incoming object and that have already been connected to the target dimension, without limiting the semantic search to a selected few fields that can be matched. The semantic search may find a template object or cluster of candidate template objects for which there is little or no exactly matched fields between the new or updated object and the template object or cluster of candidate template objects, as long as the template object or cluster of candidate template objects matches better than other candidate template objects or other clusters of candidate template objects. If the cluster of candidate template object(s) shares the same connections to the target dimension, the connections may be used with or without selecting a closest neighbor or template object from the cluster. If there are differences in the connections within the cluster, a closest neighbor or template object may be selected from the cluster. For example, a preference may be made on a most or least recently created or modified object that shares a same parent as the new or updated object.

The trained machine learning model may be applied to new objects or updated objects in the source dimension to predict connections that should exist for those objects in the target dimension. A vector embedding is generated for the new or updated object in the source dimension, and the vector embedding is fed into the trained model. The trained model may be used to determine a distance between the vector embedding and other vector embeddings of existing objects, such as an aggregate vector embedding of a closest cluster of vector embeddings that have a connection with the target dimension. For example, an "East" cluster is based on vector embeddings of objects from the source dimension that have been connected to the target dimension as members of the "East" dataset, and a "West" cluster is based on vector embeddings of objects from the source dimension that have been connected to the target dimension as members of the "West" dataset. The connection(s) corresponding to the cluster represented by the most closely matching aggregate vector embedding may be used as the predicted connection(s) for the new or updated object in the source dimension.

The predicted connection(s) may be fewer than the existing connection(s), different than the existing connection(s) but in the same number, or more than the existing connection(s). For example, a new object may have no existing connections but is predicted to have one or more connections with the target dimension. As another example, an updated object may be updated to change an address of an employee, which may change a roll-up region assigned in the target dimension from "West" to "East," for example. As yet another example, an update to the source dimension may cause the object to drop off of a list in the target dimension. For example, the list may track divisions that have reached or exceeded a budget for a time period, and the update in the source dimension may be due to an increased budget for a division or a reset in the time period (e.g., the end of a quarter or fiscal year).

In one embodiment, a synchronization user interface includes an option to select a rules-driven option or an AI-driven option for synchronizing objects between different dimensions. If the AI-driven option is selected, the synchronization user interface may provide further options to guide the AI-driven synchronization, such as fields preferred (to be more highly weighted in the vector embeddings) to use for guiding selection of a template object, fields required to match before proceeding with AI-driven selection from among matching objects, fields allowed to be used in the vector embeddings for finding a closest existing object for use as a template object, field disallowed from use in vector embeddings for finding a closest existing object for use as a template object, whether a template object must have a same parent, grandparent, great grandparent, or other ancestor as the new or updated object, whether AI-driven synchronization should be performed alone or in combination with rules-driven synchronization, etc. In one embodiment, the AI-driven option, once selected, does not require any additional selections to be made in order for the AI-driven option to be applied for finding a template object to establish connections between the selected dimensions. Once the source dimension and target dimension have been established and the AI-driven option is enabled, additional configurations may be optional, and default configurations may take effect to use vector embeddings to find template objects when objects are added or updated to the first dimension. In one embodiment, the AI-driven synchronization user interface includes an option for eliminating bias in the selection of a template object. The option to eliminate bias may exclude, from consideration for finding a template object, fields that describe protected classes, such as gender, race, or sexual orientation, and allow fields that do not describe protected classes, such as job title, work city, and years at the company. For example, fields that have data matching common, stored patterns of protected class data may be excluded. Such patterns may be stored as regular expressions of data that qualifies as protected class information.

For all embodiments using an AI model, the results of manual matching, choices, or edits to matching results and settings performed by a user may be recorded and used for training the AI model(s). For example, if an AI model generates a list of candidate matches that are presented to the user, the system may record the vector embeddings used along with the candidate match selected by the user as labeled data for further training the AI model to recognize candidate matches.

The matching search may also be performed as a hybrid process using both AI model(s) and user-defined rules. In one embodiment, a set of rules may be used to create a list of candidate matches which may then be used as the range of possible matches for an AI model trained on determining matching objects or fields to determine matches from. In this embodiment, a set of rules may be applied in a predetermined order to reduce the total number of candidate matches until the number of candidate matches is below a given threshold, or until the number of candidate matches remaining after a further rule reduces the candidate matches below a given threshold. The results of applying various rules to the set of candidate matches may also store metadata about the matches that can be included as supporting data to an AI model to further refine its results.

In another example, a hybrid model may accept input by a user to an AI model that sets a number of rules to apply or assigns a weightage to each of the techniques used in the search. For example, a user may enter a rule-based weightage, a semantic search weightage, and an equation determining a matching score based on the rule-based weightage, the semantic search weightage, the score from rule matching, and the distance determined by the semantic search. In this way, matches are determined by a maximum value of the matching score defined by the user after the application of the existing rules or AI-based search.

Defining Subscription to a Master

After a master object is determined for a field, either by an automatic process or by user input, a subscription is defined to the master object for the target field and recorded. Subscription data may define multiple fields of various objects as having a master within the same master object, however, each field's subscription to a master may be handled independently and may be unaffected by changes to subscriptions from other fields. A subscription to a master object is persistent, such that future changes to the master object in the matching field may influence the values of the target field. The subscription to the master persists until the subscription is redefined to another master object or is removed.

A subscription may be stored as data in a data synchronization system, such as in a subscription table. A subscription table may contain the subscriptions between objects, including the subscription from a target object's field to the target master object for a given field. The subscription table stores data for determining the locations of the objects that relate to the subscription, as well as the field that the subscription pertains to. The subscription table may also store further information about the subscription to assist in maintaining the subscription such as the current value of the master or target for a given item, the object type for the master or target, identifying information for the objects such as an object ID or key values for the objects or fields, or conditions or settings for the subscription.

A subscription may also define settings determining the types of actions or updates for the master that should be transmitted to the target. An example subscription may define that updates and reversions for any value within the corresponding field of the master should be sent to the target object for updating the corresponding value, however, the example subscription may specify that all other actions, such as deletions, should not be sent to the target object.

Figure 3:
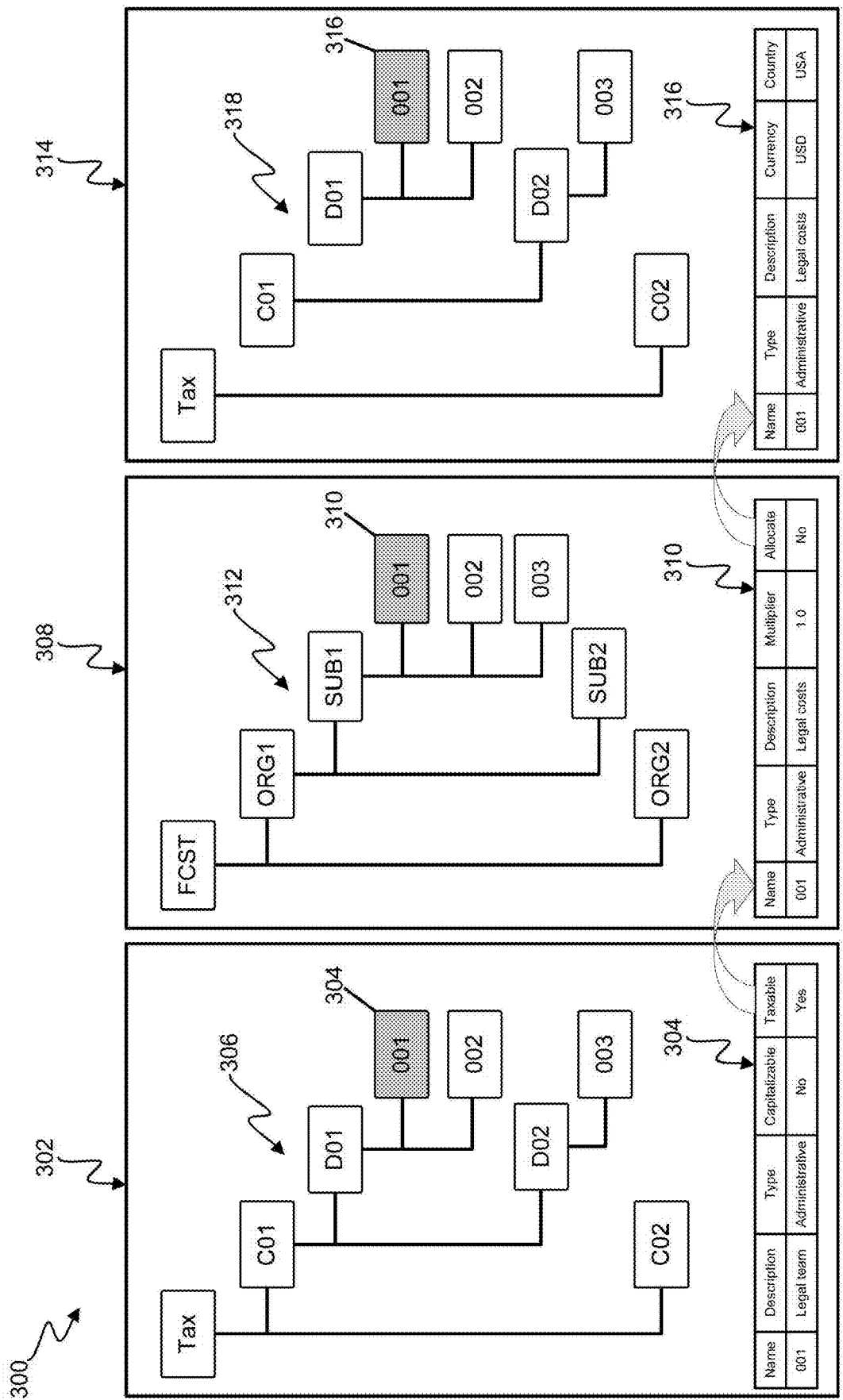
FIG. 3 depicts a simplified diagram of data within a system performing some embodiments.

FIG. 3 illustrates an example distributed system 300 employing an embodiment of a data management process flow. A first application 302 represents a general ledger for tracking information across an organization, and thus contains data about various units within the organization. The first application 302 accesses a first data entry 304 that exists within a first data hierarchy 306. The data hierarchy 306 represents the organization of various units for tax recording purposes. The first data entry 304 represents a specific unit within the organization that is currently of interest. A step is performed to define values of each of the fields within the first data entry 304. The first two fields of the first data entry 304 is referenced as the master for fields within a second data entry 310 within a second data hierarchy 312 of a second application 308. The second application 308 represents a planning application, where the second data hierarchy represents a forecast for future work of various units within the organization. The second data entry 310 corresponds to the same unit of interest as the first data entry 304. The data of the first data entry 304 is received from the first application 302 by the second application 308. The second application 308 copies the received data into the second data entry 308. The second application 308 then determines which fields of the second data entry 308 do or do not have the first data entry 304 of the first application 302 as their master. The second application 308 replaces the values of the fields of the second data entry 310 for which the first data entry 304 of the second application 308 is not the master with the most updated values possessed by the second application 308. The data of the second data entry 310 and the first data entry 304 are received by a third application 314, from a third hierarchy 318, and copied into the third data entry 316. The third application represents a data warehouse application and the third data entry 316 corresponds to the same unit of interest of the organization as the first data entry 304 and the second data entry 310. The third application determines which fields of the third data entry 316 have the first data entry 304 of the first application 302 or the second data entry 310 of the second application 308 as their respective masters. For those fields where the first data entry 304 or the second data entry 310 are not the masters of those fields, the third application replaces the values of those fields with its most updated values.

A field may also have multiple masters for separate collections of items of data for the same field. After a deduplication process, the system may determine that two or more objects contain data of the same field types, yet the items of the data are at least partially distinct across the two or more objects. A subscription to the two or more objects may be established for a single object to compile the data for all items of the same field types. In this case, the subscription may indicate the multiple master relationship or object data indicating for which items of data the subscription is for.

Subscriptions may be edited or removed after they are determined for a given field. A subject matter expert may determine that a different object, such as a newly added object, is a better master for a given field. The subject matter expert may edit the subscription, in which case the subscription is instead pointed to a new master object.

After a subscription is edited to point to a new master, the target object will receive updates of the new master's value. The previous master relationship may be recorded and may be used as a backup master relationship in the case that the new master is deleted or unreachable. A subject matter expert may also remove a subscription, in which case further updates from the master are not sent to the target object. In the case that a subscription is removed, a system storing data about the subscription may not necessarily remove the data about the subscription, instead data may be entered that determines that the subscription is not active such that the subscription may be restored in the future.

Overrides of Subscription Assignments

A subscription may be overridden for specific records, instances, or applications such that a new data source may be defined for only those records, instances, or applications. A subscription defines a default mapping for determining candidate values for every record containing data of fields pertaining to that subscription; however, this default may be undesirable in some cases. By choice of a subject matter expert and/or by automatic process, an override may be defined to create a new mapping for determining candidate values alternative to the default described by the subscription. Whether by automatic process or by election from a subject matter expert upon receiving a prompt, the determination of a preferred data source for use in defining an override may be determined by the subject matter expert via manual input and/or by the matching techniques as described in the Data Matching section above. The automatic matching process used for determining overrides may be triggered by predetermined conditions such as detecting that a master defined by a subscription is no longer available or detecting too great of a discrepancy between values of a specific record and a master.

As an example of a system to implement a subscription override, a system may manage data subscriptions for a first, second, and third application, each with their own sets of data, such as versions of objects, that the system may access. The system has previously received a subscription that it has stored in a subscription table. The subscription defines multiple mappings for the third application for determining candidate values for the third application's set of data: the third application is subscribed to a first version of a first field of the first application's set of data; and the third application is subscribed to a first version of a second field of the second application's set of data. There may be any combination of other versions of fields between the three applications' sets of data that are not currently described by the subscription. For this example, there is at least a second version of the first field in the second application's set of data. There may not necessarily be another version of the second field in the first application's set of data, as the existence of other versions of the second field does not affect the subscription's mapping regarding the first field. Based on the subscription's default mapping for determining candidate values, notifications of updates or new versions for items of the first field of the first application's set of data trigger a determination, based on the subscription of the third application to the first application, for candidate values derived from the first field of the first application's set of data to be used as a new version of the first field for the third application's set of data.

To implement a subscription override, this example system may receive data regarding the override such as via a user input overriding the mapping for the first field of the third application's set of data to instead point to the first field of the second application's set of data. The override of the mapping may be specific to a corresponding item of the first field for which a new version was created in the third application's set of data in a prior update to the first field of the first application's set of data. The override is stored by storing override metadata, for any corresponding items, to indicate that candidate values for the first field of the third application's set of data should instead be determined from the first field of the second application's set of data. If the override is specific to one corresponding item, the override will only store override metadata for that corresponding item. After storing a subscription override, such as the example above, future notifications of updates or other actions to the corresponding items of the relevant field of the second application's set of data will trigger modifications to the corresponding item of the relevant field of the third application's set of data.

To implement subscription overrides, override metadata may be stored in a link table. The link table may be object-specific, record-instance-specific, and application-specific, as the link table stores override values for each record instance that is overridden, and the override values may specify which objects, application sources, and application targets are involved in the overrides. The link table may record all overrides for a distributed system or for a subset of the distributed system, such as for a subset of applications. In addition to data overrides, the link table may describe a data source and data target for other record instances described by the link table, which may even include all record instances to which subscriptions apply.

To record an override to a subscription, data representing the override may be entered in a link table that acts as a final determination for the mapping of sources for data values. The link table may record all the mappings of data value sources defined by relevant subscriptions. In this case, when recording an override, the mapping recorded in the link table may be edited to instead record the new data source defined by the override. When determining actions or updates of a data value source to send to the target record instance, the link table is checked for the targets to send the actions or updates to. Alternatively, the link table may only record data of overrides, in which case the link table is referenced when an action or update is received to determine whether there is an override that alters the default behavior of the subscription. In this case, a null value or a lack of an entry in the link table relating to the record instance in question causes the default mapping of the subscription to be used.

As an example, the link table may contain fields identifying the master object name or other identifier, a network address or other background information for the master object, and/or other descriptive information about the master object where each item of the link table represents a record instance of an object. The value of the master object name, identifier, address, and/or other information are changed to the name, identifier, address, or other information of the new object used as the data source as identified in the override. In another example, a field of the link table may identify an overriding master object with a null value if the original master object is used. In this example, the override is recorded by entering identifying information about the new object used as the data source as identified in the override and the identifying information about the original master object is preserved within the link table.

TABLE 1

| Data Source | Source Record ID | Source Node Name | Source Node Type | Target Record ID | Target Node Name | Target Node Type | Target Data Source ID |
|---|---|---|---|---|---|---|---|
| S1 | 123 | Sales | Internal | 345 | General Ledger | Internal | GL |
| S2 | 1234 | Subsidiary | Subsid | 345 | General Ledger | Internal | GL |
| S3 | 12345 | Inventory | Internal | 345 | General Ledger | Internal | GL |
| S4 | 123456 | Supplier | Supp | 345 | General Ledger | Internal | GL |
| GL | 345 | General Ledger | Internal | 9876 | Contract Inc. | Cust | D1 |
| GL | 345 | General Ledger | Internal | 98765 | Human Resources | Internal | D3 |

TABLE 1-continued

| Data Source | Source Record ID | Source Node Name | Source Node Type | Target Record ID | Target Node Name | Target Node Type | Target Data Source ID |
|---|---|---|---|---|---|---|---|
| GL | 345 | General Ledger | Internal | 987654 | Analytics | Internal | D2 |
| D2 | 987654 | Analytics | Internal | 5678 | Tax | Internal | D4 |
| D4 | 5678 | Tax | Internal | 987654 | Analytics | Internal | D2 |

Table 1 shows an example link table. The link table contains fields describing a source record of one set of data or object and the linked target record of another set of data or record. Each record describes a link between a source record and a target record. In this example, for the two records described in each line there is a name field, an ID field, a type field, and a label field. When detecting an update to one of the records described by this link table, the system first checks the link table to determine if there are any links from that record as a source record to another record. The system then sends any data for which there is a relevant link in the link table or for which there is a default mapping defined by a subscription in the case there is no corresponding link in the link table.

The link table records at least identifying data for any source records or objects and their target records or objects. The identifying data may be a record ID, which may be used to identify the record intended and locate the data stored within that record. A record ID may also indicate identifying information for the node, object, or set of data that contains that record to aid in the locating of the record and its data. The link table may also optionally contain keys used in the identification of records such as global record IDs used to verify a correspondence between the source record and the target record described by an entry in the link table.

In the example embodiment of FIG. 3, the third application 314 has a subscription to the first application for the fields of "Name" and "Type" and a subscription to the second application for the field of "Description." A subject matter expert could override the subscription of the third application for the record shown for the field of "Description" and instead point to the second application as the new data value source. In this example, a data mastering system that has recorded the subscriptions between the applications receives the override from the subject matter expert and edits a link table item detailing the mapping for values in the record in question for the "Description" field. The data mastering system changes the data source name value for the "Description" field to the second application and edits any necessary data location information to point to the relevant record's "Description" field. When a future update is made to the "Description" field of that record of the second application, data detailing the update is sent from the second application to the third application, but information does not need to be exchanged between the first application and the third application.

The overriding of a value of a field for a specific record used by a specific application causes the field which would have been updated by a first master from another application to instead be updated by a second master from yet another application. The overriding may be temporary, in which case the value may be overridden again by an update sent from the master data. Alternatively, the overriding of a value may be permanent (for example, until overridden again), in which case future updates are provided by the second master as the updates occur. In either case, metadata about the overriding can be stored in the link table describing the conditions of the override. A temporary overriding of a value may be performed by a modification at the application level which by default may store the override as a temporary or permanent override in the link table. A permanent overriding of a value at the application level may ignore or render unnecessary further updates that would have otherwise been sent by the first master, and may instead apply updates sent by the second master. A permanent overriding of a value at the data management system level may store metadata within a link table that determines what type of updates or actions regarding the master data should be sent for updating the target data.

An override may be used to implement multiple masters for different types of updates to a record or for different fields of the record. A link table may record multiple entries of data value sources for a record, each describing mappings between different source field instances (e.g., different masters) to different target field instances, optionally in different circumstances. For example, a field of a target application may be subscribed to a first object as a general master for updates and revisions, while an override is recorded for a specific instance of the field to a second object that may have a different instance of the field having potentially a different value as a second object holding the different instance of the field is updated. In this way, the value may pull candidate values for new versions of data from the second object for the specific instance of the field, while still honoring the subscription for other updates to other instances of the field as the first object is updated to update the other instances of the field for other records in the target application. This type of override may be recorded in a link table as multiple separate entries (both for the overridden and non-overridden field instances), or the scenario may be recorded as an override for the relevant field instance(s) without recording any information for non-overridden field instance(s).

Computer System Architecture

Figure 5:
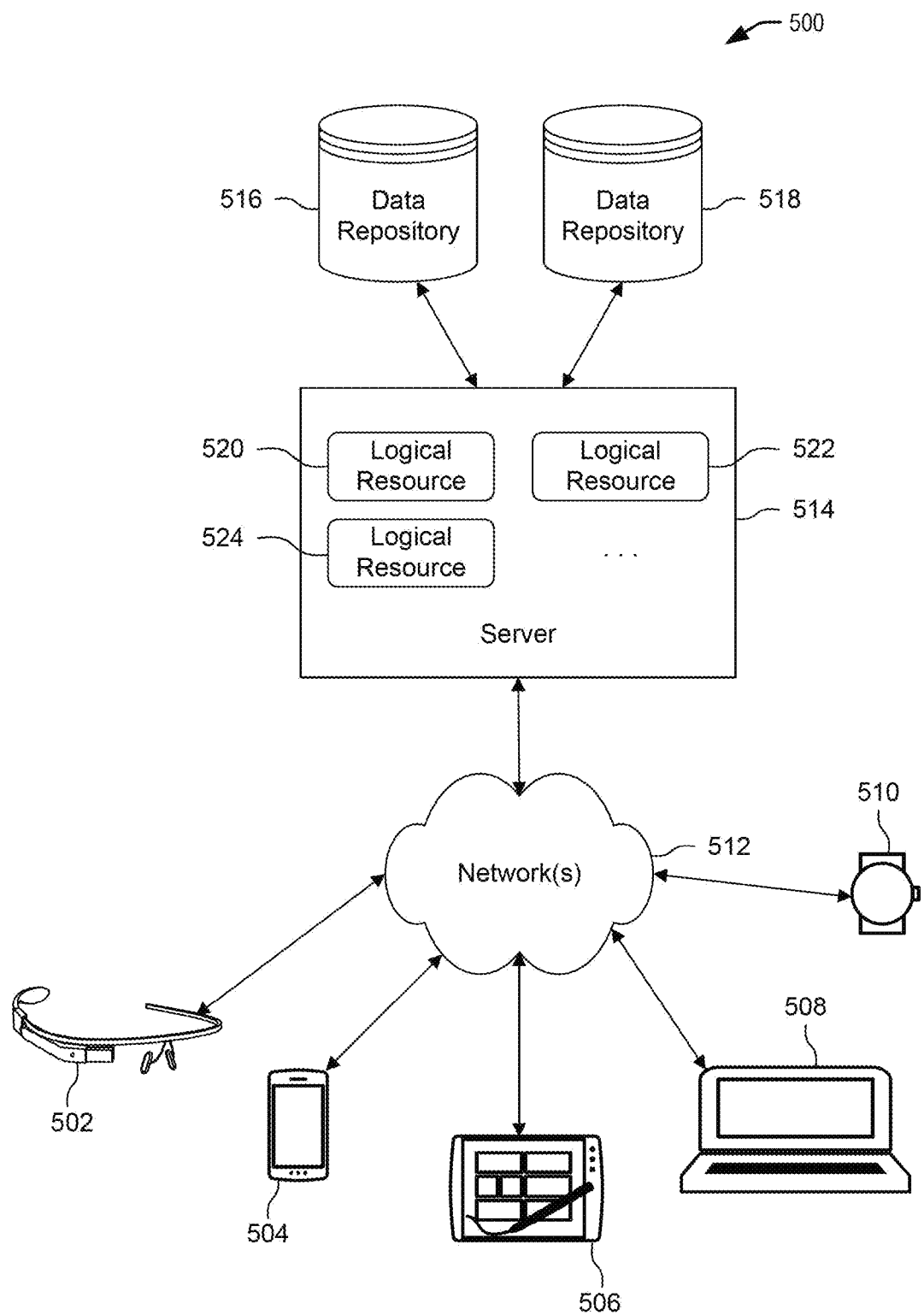
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for master data management.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for master data management in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for master data management. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
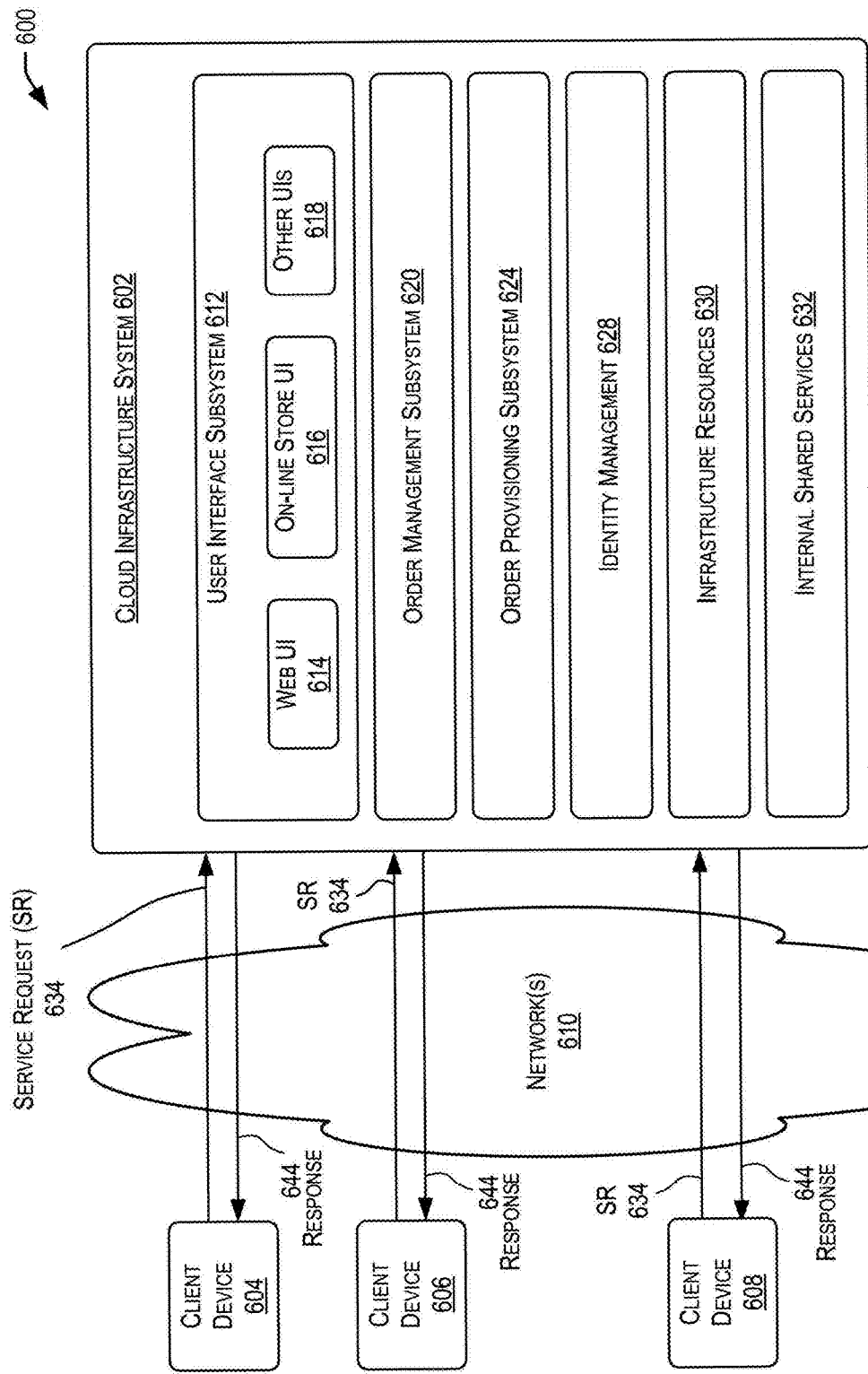
FIG. 6 is a simplified block diagram of one or more components of a system environment by which services provided by one or more components of an embodiment system may be offered as cloud services, in accordance with certain aspects.

In certain aspects, the techniques for master data management. FIG. 6 is a simplified block diagram of a cloud-based system environment in which master data management, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to provide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to.

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
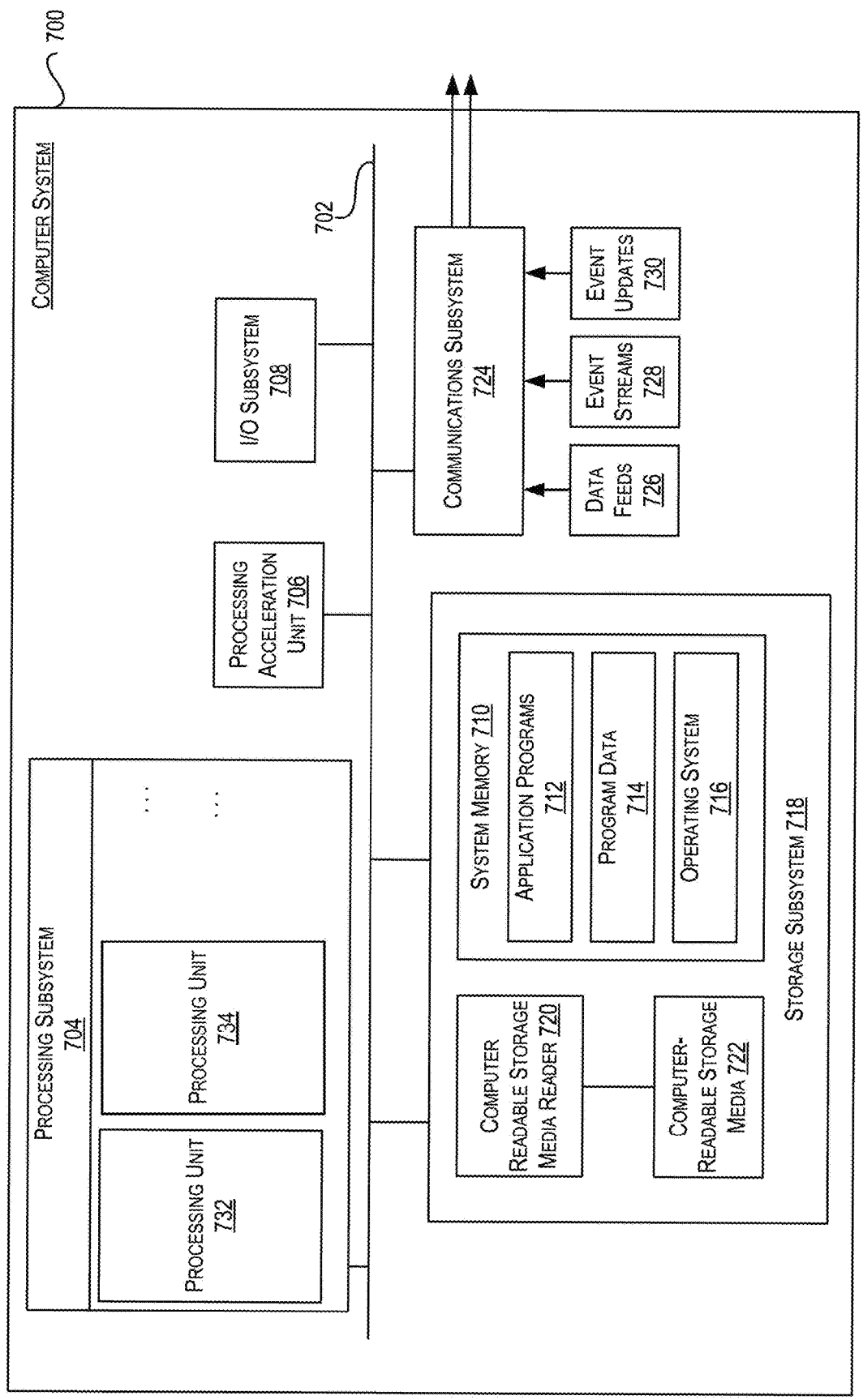
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
    accessing a plurality of sets of data, wherein the plurality of sets of data comprise a first set of data managed by a first application, a second set of data managed by a second application, and a third set of data managed by a third application;
    receiving a subscription from the third application to a first version of a first field of the first set of data and a first version of a second field of the second set of data, wherein a second version of the first field exists in the second set of data, wherein the first version of the second field does not exist in the first set of data, and wherein the subscription indicates a first mapping for determining values of the first field of the third set of data from values of the first field of the first set of data;
    receiving a notification about a first item of the first set of data, wherein the notification comprises a first value of the first field of the first item;
    determining that the third set of data is subscribed to the first version of the first field of the first set of data;
    based at least in part on the first mapping, determining a candidate value from the first value to use as a third version of the first field for a first corresponding item of the third set of data;
    receiving user input overriding the first mapping for the first corresponding item to determine values for the first field of the third set of data from the second version of the first field of the second set of data;
    storing override metadata in association with the first corresponding item, wherein the override metadata indicates the second set of data is a data source for the third set of data;
    after storing the override metadata, receiving a notification of an update to a second corresponding item of the second set of data; and
    based at least in part on the override metadata, triggering a modification to the first corresponding item based on the update to the second corresponding item.

2. The computer-implemented method of claim 1, wherein the subscription indicates a second mapping for determining values of a second field from the third set of data from values of the second field of the second set of data, and wherein the method further comprises:

receiving a notification of a first update to a second value of the second field of the second set of data;

determining that the third set of data is subscribed to the first version of the second field of the second set of data;

based at least in part on the second mapping, determining a second candidate value from the second value to use as a second version of the second field of the third set of data;

receiving user input overriding the second version of the second field of the third set of data;

after receiving user input overriding the second version of the second field of the third set of data, receiving a notification of a second update to the second value of the second field of the second set of data; and based at least in part on the second mapping, determining a third candidate value from the second value to use as a second version of the second field of the third set of data.

3. The computer-implemented method of claim 1, wherein the subscription indicates a second mapping for determining values of a second field from the third set of data from values of the second field of the second set of data, and wherein the method further comprises:

receiving a notification of a first update to a second value of the second field of the second set of data;

determining that the third set of data is subscribed to the first version of the second field of the second set of data;

based at least in part on the second mapping, determining a second candidate value from the second value to use as a second version of the second field of the third set of data;

receiving a user input overriding the second mapping to determine values for the second field of the third set of data from an internal source within the third application; and storing override metadata in association with the second field of the third set of data, wherein the override metadata indicates the second set of data is not a data source for the third set of data.

4. The computer-implemented method of claim 1, wherein the subscription is also to a third field of the third set of data and wherein, after storing the override metadata, the subscription indicates a third mapping for determining values of a third field of the third set of data from values of a third field of the first set of data.

5. The computer-implemented method of claim 1, wherein the user input overriding the mapping comprises a response to an indication of a preference for subscribing to the first field of the second set of data.

6. The computer-implemented method of claim 1, wherein the method further comprises:

storing the subscription as an entry in a table comprising identifying data of the first application and identifying data of the third application.

7. The computer-implemented method of claim 1, wherein receiving the subscription from the third application comprises:

receiving an indication that the first field of the first set of data and the first field of the third set of data refer to a same value.

8. The computer-implemented method of claim 1, wherein the receiving user input overriding the first mapping is in response to an indication that the first set of data is no longer available.

9. The computer-implemented method of claim 1, wherein the subscription comprises an update setting and wherein the triggering the modification to the first corresponding item is at least in part in response to the update to the second corresponding item of the second set of data satisfying one or more conditions specified in the update setting.

10. The computer-implemented method of claim 1, wherein the method further comprises generating the subscription from the third application to the first version of the first field of the first set of data based at least in part upon an indication from a machine learning model that indicates the first version of the first field of the first set of data is a most complete version of the first field from which to determine a candidate value.

11. A computer-program product comprising one or more non-transitory machine-readable storage media, including stored instructions configured to cause a computing system to perform a set of actions including:

accessing a plurality of sets of data, wherein the plurality of sets of data comprise a first set of data managed by a first application, a second set of data managed by a second application, and a third set of data managed by a third application;

receiving a subscription from the third application to a first version of a first field of the first set of data and a first version of a second field of the second set of data, wherein a second version of the first field exists in the second set of data, wherein the first version of the second field does not exist in the first set of data, and wherein the subscription indicates a first mapping for determining values of the first field of the third set of data from values of the first field of the first set of data;

receiving a notification about a first item of the first set of data, wherein the notification comprises a first value of the first field of the first item;

determining that the third set of data is subscribed to the first version of the first field of the first set of data;

based at least in part on the first mapping, determining a candidate value from the first value to use as a third version of the first field for a first corresponding item of the third set of data;

receiving user input overriding the first mapping for the first corresponding item to determine values for the first field of the third set of data from the second version of the first field of the second set of data;

storing override metadata in association with the first corresponding item, wherein the override metadata indicates the second set of data is a data source for the third set of data;

after storing the override metadata, receiving a notification of an update to a second corresponding item of the second set of data; and based at least in part on the override metadata, triggering a modification to the first corresponding item based on the update to the second corresponding item.

12. The computer-program product of claim 11, wherein the subscription indicates a second mapping for determining values of a second field from the third set of data from values of the second field of the second set of data, and wherein the set of actions further includes:

receiving a notification of an update to a second value of the second field of the second set of data;

determining that the third set of data is subscribed to the first version of the second field of the second set of data;

based at least in part on the second mapping, determining a second candidate value from the second value to use as a second version of the second field of the third set of data; and receiving user input overriding the second version of the second field of the third set of data.

13. The computer-program product of claim 11, wherein the subscription indicates a second mapping for determining values of a second field from the third set of data from values of the second field of the second set of data, and wherein the set of actions further includes:

receiving a notification of a first update to a second value of the second field of the second set of data;

determining that the third set of data is subscribed to the first version of the second field of the second set of data;

based at least in part on the second mapping, determining a second candidate value from the second value to use as a second version of the second field of the third set of data;

receiving a user input overriding the second mapping to determine values for the second field of the third set of data from an internal source within the third application; and storing override metadata in association with the second field of the third set of data, wherein the override metadata indicates the second set of data is not a data source for the third set of data.

14. The computer-program product of claim 11, wherein the user input overriding the mapping comprises a response to an indication of a preference for subscribing to the first field of the second set of data.

15. The computer-program product of claim 11, wherein the set of actions further includes:

storing the subscription as an entry in a table comprising identifying data of the first application and identifying data of the third application.

16. A system comprising:

one or more processors;

one or more non-transitory computer-readable media storing instructions, which, when executed by the system, cause the system to perform a set of actions including:

accessing a plurality of sets of data, wherein the plurality of sets of data comprise a first set of data managed by a first application, a second set of data managed by a second application, and a third set of data managed by a third application;

receiving a subscription from the third application to a first version of a first field of the first set of data and a first version of a second field of the second set of data, wherein a second version of the first field exists in the second set of data, wherein the first version of the second field does not exist in the first set of data, and wherein the subscription indicates a first mapping for determining values of the first field of the third set of data from values of the first field of the first set of data;

receiving a notification about a first item of the first set of data, wherein the notification comprises a first value of the first field of the first item;

determining that the third set of data is subscribed to the first version of the first field of the first set of data;

based at least in part on the first mapping, determining a candidate value from the first value to use as a third version of the first field for a first corresponding item of the third set of data;

receiving user input overriding the first mapping for the first corresponding item to determine values for the first field of the third set of data from the second version of the first field of the second set of data;

storing override metadata in association with the first corresponding item, wherein the override metadata indicates the second set of data is a data source for the third set of data;

after storing the override metadata, receiving a notification of an update to a second corresponding item of the second set of data; and based at least in part on the override metadata, triggering a modification to the first corresponding item based on the update to the second corresponding item.

17. The system of claim 16, wherein the subscription indicates a second mapping for determining values of a second field from the third set of data from values of the second field of the second set of data, and wherein the set of actions further includes:

receiving a notification of an update to a second value of the second field of the second set of data;

determining that the third set of data is subscribed to the first version of the second field of the second set of data;

based at least in part on the second mapping, determining a second candidate value from the second value to use as a second version of the second field of the third set of data; and receiving user input overriding the second version of the second field of the third set of data.

18. The system of claim 16, wherein the subscription indicates a second mapping for determining values of a second field from the third set of data from values of the second field of the second set of data, and wherein the set of actions further includes:

receiving a notification of a first update to a second value of the second field of the second set of data;

determining that the third set of data is subscribed to the first version of the second field of the second set of data;

based at least in part on the second mapping, determining a second candidate value from the second value to use as a second version of the second field of the third set of data;

receiving a user input overriding the second mapping to determine values for the second field of the third set of data from an internal source within the third application; and storing override metadata in association with the second field of the third set of data, wherein the override metadata indicates the second set of data is not a data source for the third set of data.

19. The system of claim 16, wherein the user input overriding the mapping comprises a response to an indication of a preference for subscribing to the first field of the second set of data.

20. The system of claim 16, wherein the set of actions further includes:

storing the subscription as an entry in a table comprising identifying data of the first application and identifying data of the third application.

* * * * *